June 19, 1962  G. D. SHELTON-V  3,039,702
FLUID TIP AND AIR CAP
Filed Dec. 14, 1959  3 Sheets-Sheet 1
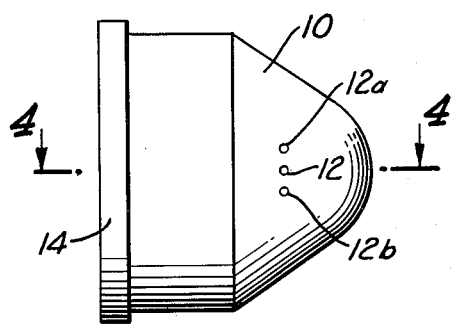
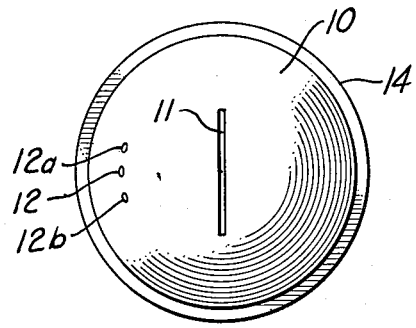
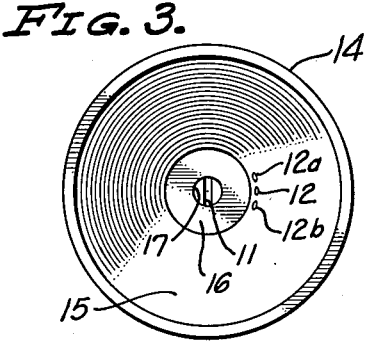
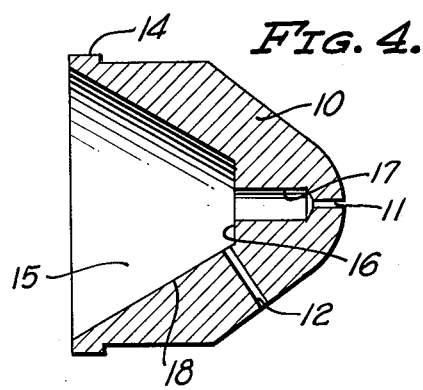
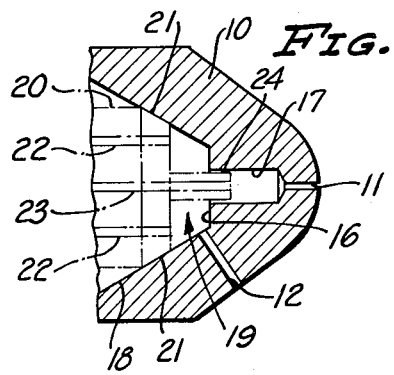
INVENTOR.
GEORGE D. SHELTON-V
BY
ATTORNEY June 19, 1962  G. D. SHELTON-V  3,039,702
FLUID TIP AND AIR CAP
Filed Dec. 14, 1959  3 Sheets-Sheet 2

INVENTOR
GEORGE D. SHELTON V
BY
ATTORNEY

June 19, 1962 G. D. SHELTON-V 3,039,702
FLUID TIP AND AIR CAP
Filed Dec. 14, 1959 3 Sheets-Sheet 3

INVENTOR
GEORGE D. SHELTON V
BY
ATTORNEY

3,039,702
FLUID TIP AND AIR CAP

George D. Shelton-V., Riverside, Calif., assignor, by mesne assignments, to The Flintkote Company, New York, N.Y., a corporation of Massachusetts
Filed Dec. 14, 1959, Ser. No. 859,536
1 Claim. (Cl. 239—549)

This invention relates generally to fluid spraying apparatus and more particularly to a new and improved tip for a spray gun nozzle.

The practice of spraying resins and other fluids in conjunction with glass and other fibers is becoming increasingly more prevalent and in particular the type of apparatus using two fluid spraying nozzles in conjunction with a stream of chopped fibers or other material is becoming more wide spread.

The greatest single problem in connection with satisfactortorily spraying glass fibers particularly and other items generally in connection with two streams of resins, is to secure a proper "wetting out." By this term, it is meant the complete enveloping of each fiber or each other particle with the resin or other liquid concerned.

I have devised a new and improved fluid cap or tip for spray guns utilizing two fluid sprays in conjunction with other materials which provides a jet action cooperative with the fluid spray and which disperses the fibers or other particles in such manner that each such particle or fiber is completely turbulated in the jet stream and spray stream such that complete wetting of the individual particle is accomplished, thus resulting in a superior finished product.

Thus, it is an important object of my invention to provide a fluid tip for a spray gun, incorporating an air jet.

It is a further object of this invention to provide such a tip as to create turbulence in particles being sprayed.

It is a still further object of my invention to provide a tip of the class described which provides a turbulence and thorough wetting out of particles being sprayed in conjunction with fluid.

The foregoing and other objects and advantages of this invention will be apparent to those skilled in the art by reference to the following description when read in conjunction with the attached drawings in which:

FIGURE 1 is a perspective of a preferred embodiment of the fluid tip and air cap as described;

FIGURE 2 is a front view of the same fluid tip and air cap;

FIGURE 3 is a rear view of the same fluid tip and air cap;

FIGURE 4 is a cross section through 4—4 of FIGURE 1; and

FIGURE 5 is the same view as FIGURE 4 except that the source of air and fluid material is shown in phantom lines.

Figure 6:
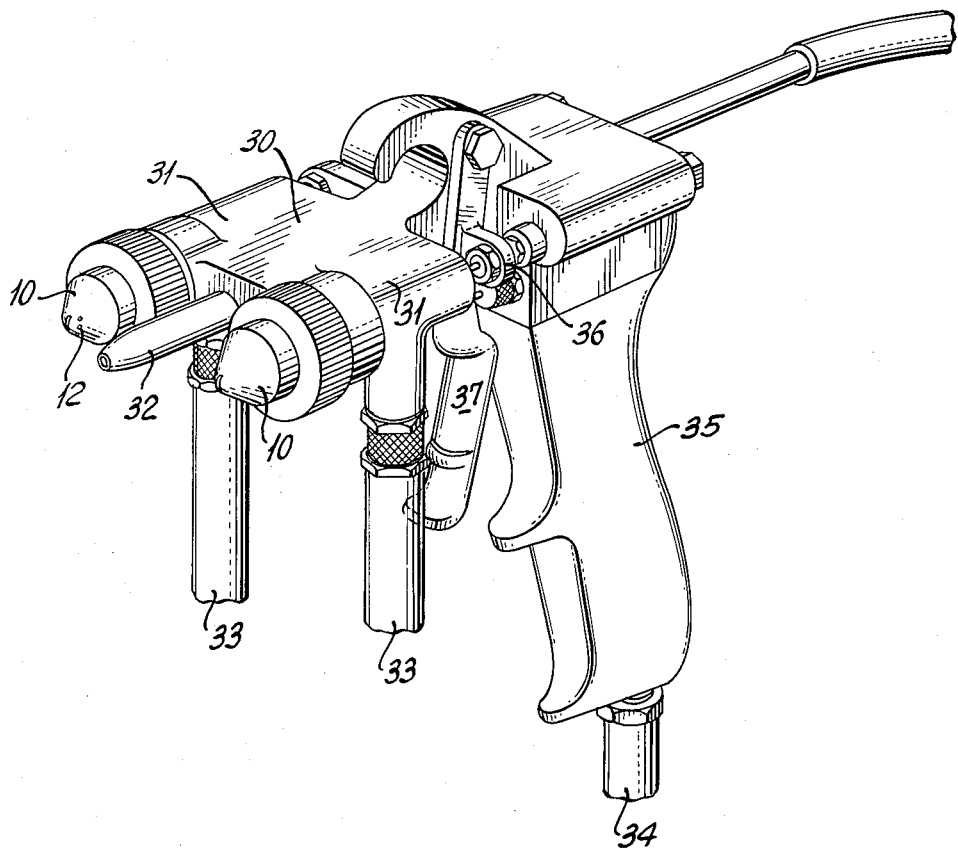

A two barrel spray gun of well known construction such as that described in Patent No. 2,813,751 and as further described in my co-pending patent application No. 697,040, filed November 18, 1951, or other such devices of customary construction and with customary arrangement for a supply of air and fluid to each of the nozzles but of the type utilizing internal atomization rather than external atomization require a cap and fluid tip upon each fluid barrel.

Any supply of fibers or other material may be utilized between the two barrels such as that described in my heretofore referenced co-pending application utilizing a barrel through the center and between the two fluid nozzles or other suitable arrangement, many of which are on the market and known in the trade.

The fluid cap 10 is used on each of the barrels and the same identically described fluid cap must be used on each such barrel in order to achieve proper results.

The fluid cap 10 is seen to have a spray aperture 11 and jet apertures 12, 12a and 12b. The fluid cap is provided with a chamber 15 of frustro-conical section as indicated, the surfaces of the same being indicated by the referenced numeral 18.

A shoulder 16 is provided to reduce the diameter and a reduced diameter hole 17 is provided with a reduction to an intercommunication with a slot 11 as shown. Slot 11 is set at a slight angular relation to the axis of the fluid cap 10 in order that the material coming through slot 11 will angle inward towards the center and towards the other fluid cap on the other barrel. It will be observed that two fluid caps having identical angular relations of slot 11 to the axis of the fluid cap will direct the stream of material towards a common axis where they will meet.

The cap is provided with a flange 14 so that a sleeve or coupling having an internal shoulder may be slipped over the cap and engage flange 14 to hold it in position upon the end of a spray gun barrel.

The source of fluid and air supply shown in phantom lines and indicated generally by the reference numeral 20 is seen to consist of a cylinder of steel or the like having a chamfered end 21 to provide a shoulder which fits against the inclined surface 18 and is also seen to have a forward projecting cylinder 24 with the fluid passage 23 such that fluid passing through 23 is discharged into the area 17.

Air passes through a plurality of air passages 22 and into the chamber 19 and from thence around the cylinder 24 into the chamber 17.

A portion of the air passing into the chamber 19 escapes through holes 12, 12a, and 12b. It is possible to utilize a slot in place of said holes or to utilize one, two, three or more holes, depending upon the results desired as hereinafter more fully described.

In practice, the fibers or other materials coming through the source of fiber supply between the two fluid barrels are struck by the opposed and turbulating jet streams coming through the jet aperture 12, 12a, and 12b as previously described. It will be observed that when two fluid caps as herein described are utilized at a distance from one another with the jet apertures and fluid slot facing towards each other that the jet streams will meet each other and create a turbulence the same as the sources of fluid material will meet each other.

The turbulating effect achieved at the juncture of these jet streams is such that the fibers or other particles are completely dispersed in a uniform pattern and are projected forward into the point of juncture of the spray streams which is forward of the point of juncture of the jet streams.

At this point, it is clear that the two converging spray streams also are undergoing turbulance which completely atomizes the spray streams into a fine spray and the fiber or other particles now turbulating into this new turbulance are completely mixed and covered individually by the liquid material. Thus the complete wetting out of the material as desired is completely achieved.

It will be observed that by the formation of these jet turbulances as indicated, the material being fed into the spray stream has already achieved a like pattern with that of the spray stream, where previously if such turbulating influences have not been introduced, the material enters the turbulating spray stream in a more or less solid stream and only the outer portions of this stream are thorougly wet out. However, by being turbulated and dispersed into a pattern similar to the fluid patterns a proper and entire mixing is now achieved.

In addition, the turbulating air streams as created by the jets as indicated creates a wider fan of sprayed materials than would result such jet streams and by changing the angle of the jet streams and increasing or decreasing the number of holes involved or changing to a slot, the width of such fan can be increased or decreased as desired for the particular operation being undertaken.

While this specific embodiment of my invention specifically illustrated and described herein is fully capable of achieving the results, objects and advantages desired, it will be clear to those skilled in the art that many modifications might be made without departing from the inventive concept disclosed. It is not my intention that my invention be restricted by these specific embodiments disclosed.

Figure 7:
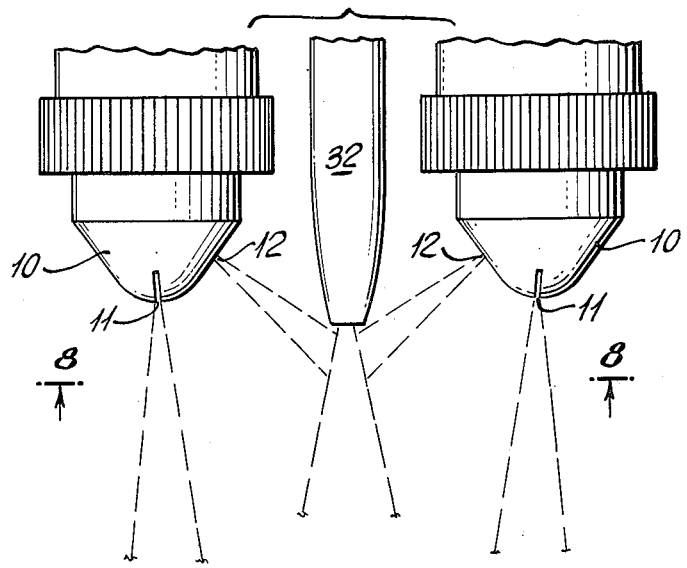
Figure 8:
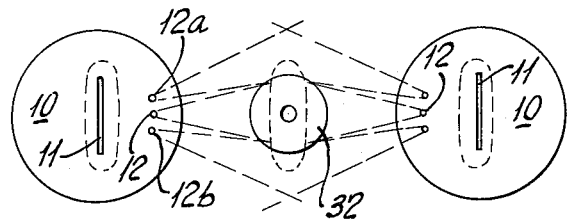

FIGS. 6, 7 and 8 show the application of the invention to the spray gun as shown in my co-pending application Serial No. 697,040, filed November 18, 1957. FIG. 6 is a perspective view of the gun body 30 having two outer barrels 31—31 on which are mounted the fluid tips 10—10. Between the two outer barrels is a third barrel 32 for spraying additive material such as roving or filaments of glass or the like as is described in the said co-pending application. Fluid to the fluid tips is supplied through hoses 33—33, while air is supplied through hose 34 passing through the gun handle 35 and controlled by the valve mechanism 36 and trigger 37. As will be seen at FIGS. 7 and 8 the liquid from spray apertures 11—11 converges to a point substantially outside of the gun. The additive material from third barrel 32 is acted upon by the air from jets 12—12, 12a—12a and 12b—12b. Thus the additive material falls within the turbulence caused by the meeting air jets and fans out more or less as indicated by the dotted lines at FIG. 8 rather than a circular pattern which would be expected to result from the third barrel 32.

I claim:

A spray gun having a main body, a pair of parallel spaced-apart nozzles disposed at the front of said body, each of said nozzles including a hollow forwardly and inwardly tapering air tip element and a frusto-conical fluid tip element positioned within said air tip element, a spray aperture formed in the front portion of each of said air tip elements with the axes of said apertures being inclined towards one another, means for connecting the interior of said fluid tip element with a fluid source, a plurality of air spray apertures grouped on the inside surface of each of said nozzles, means for connecting the interior of said air spray apertures in the interior of said nozzles with a source of compressed air separate from said fluid source.

References Cited in the file of this patent
UNITED STATES PATENTS

| | | |
|---|---|---|
| 1,494,020 | Riehm | May 13, 1924 |
| 2,193,100 | Jones | Mar. 12, 1940 |
| 2,370,408 | MacDonald | Feb. 27, 1945 |
| 2,433,463 | Lampe | Dec. 30, 1947 |
| 2,606,072 | Mantle | Aug. 5, 1952 |
| 2,663,591 | Pew | Dec. 22, 1953 |
| 2,813,751 | Barrett | Nov. 19, 1957 |